United States Patent [19]

Cadeddu

[11] 4,297,846
[45] Nov. 3, 1981

[54] TWO-COMPARTMENTS FLUID RESERVOIR

[75] Inventor: Leonardo Cadeddu, Crema, Italy

[73] Assignee: Benditalia S.p.A., Crema, Italy

[21] Appl. No.: 130,326

[22] Filed: Mar. 14, 1980

[51] Int. Cl.³ .............................................. B65D 1/24
[52] U.S. Cl. .................... 60/585; 137/262; 137/574; 137/576; 137/592; 220/22; 60/592
[58] Field of Search ................. 60/585, 592; 137/255, 137/262, 571, 574, 576; 220/20, 22

[56] References Cited

U.S. PATENT DOCUMENTS

| | | | |
|---|---|---|---|
| 4,133,287 | 1/1979 | Downs | 60/592 X |
| 4,166,431 | 9/1979 | Pickering | 60/585 X |
| 4,185,750 | 1/1980 | Camp | 220/22 X |
| 4,217,922 | 8/1980 | Come | 60/592 X |

*Primary Examiner*—Alan Cohan

*Attorney, Agent, or Firm*—Paul David Schoenle; Ken C. Decker

[57] ABSTRACT

The invention relates to a two-compartment reservoir for liquid, comprised of two superposed parts and provided with a transfer channel which opens into both compartments and which runs parallel to the plane of the liquid contained in the reservoir.

The junction plane of the two parts of the reservoir is inclined, with respect to the bottom of each of them, at an angle "α/2", which permits to manufacture with the same parts two types of reservoirs: the first one for horizontal installation and the other one for inclined installation, at an angle "α".

Suitable grooves, provided in the walls, of the two parts cooperate in both cases to form the transfer channel parallel to the plane of liquid.

The invention is particularly useful in hydraulic braking systems for automotive vehicles.

9 Claims, 4 Drawing Figures

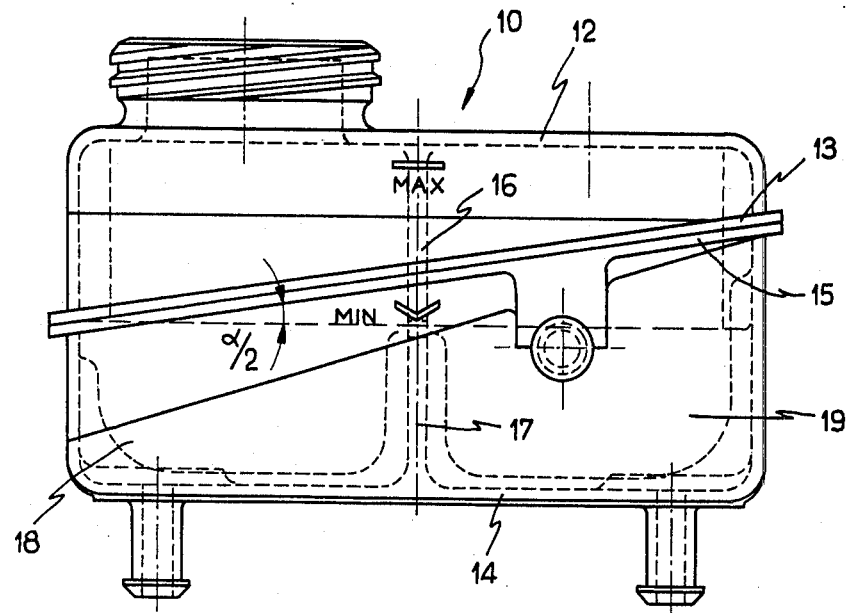
FIG_1
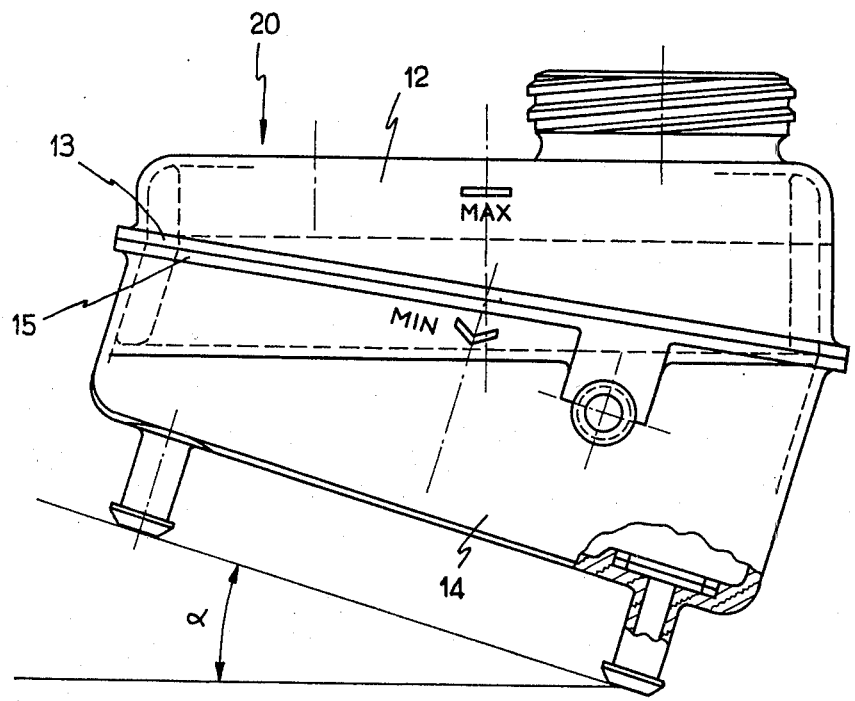
FIG_2

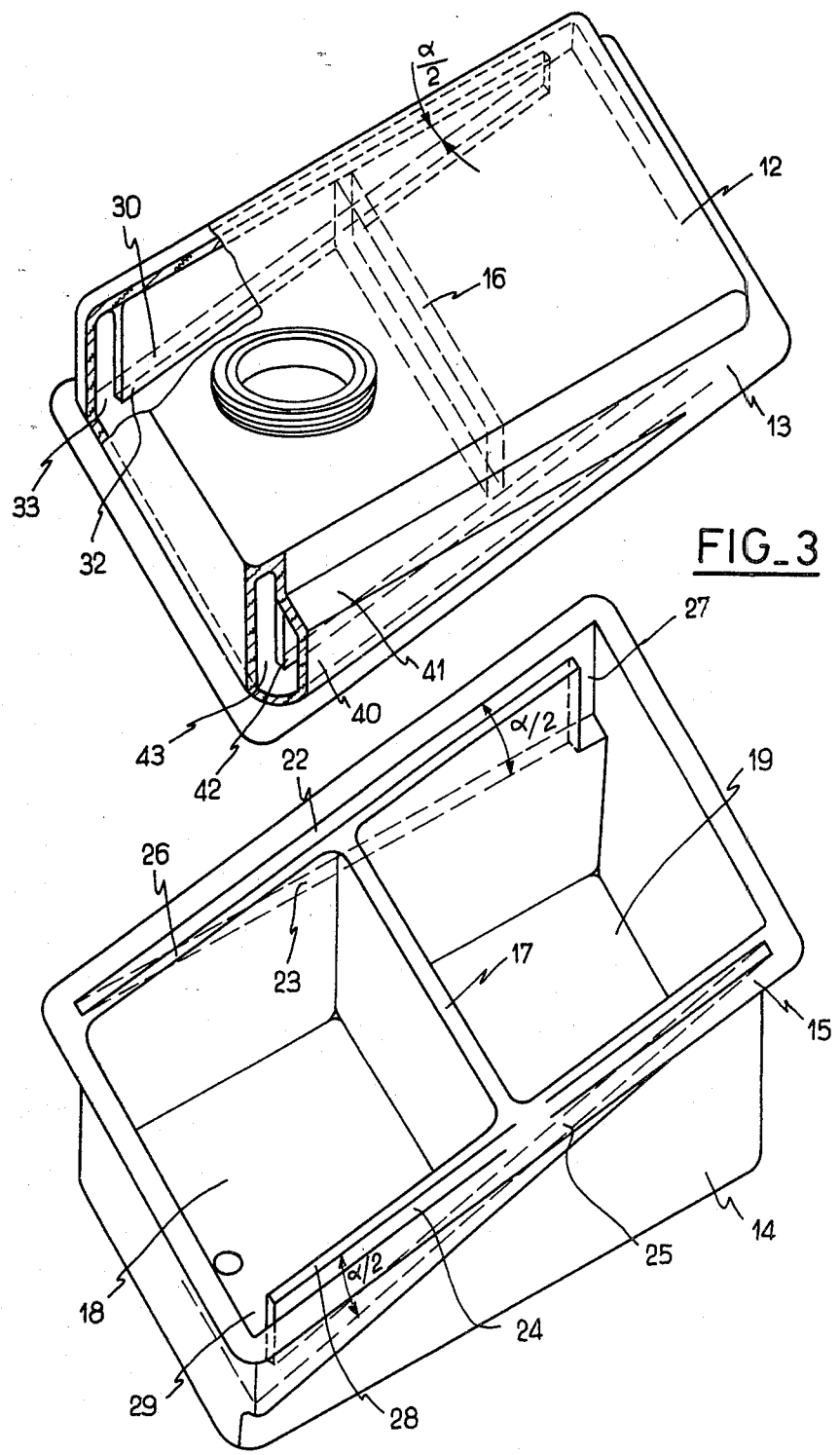
FIG_3

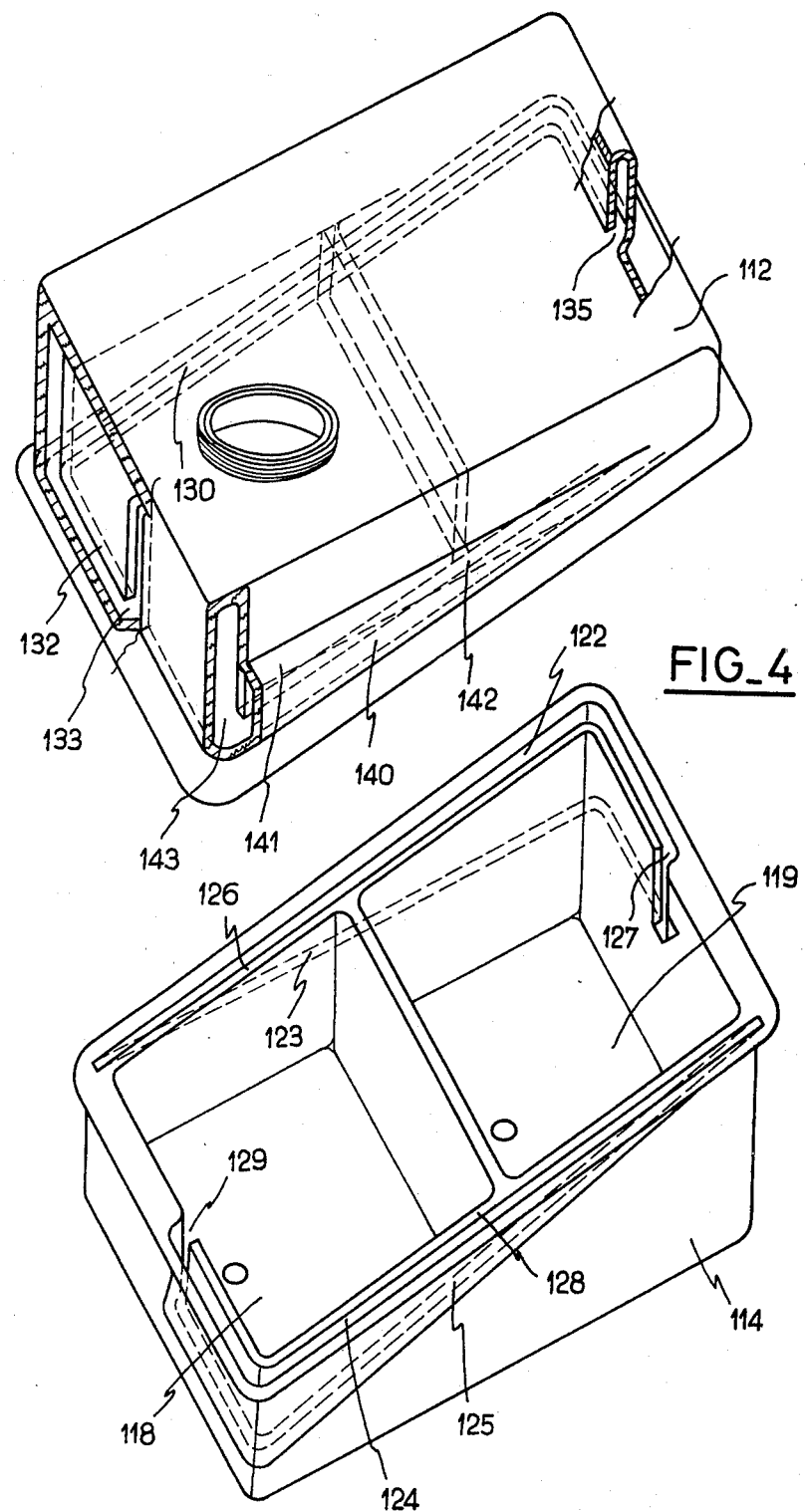
FIG_4

TWO-COMPARTMENTS FLUID RESERVOIR

The present invention relates to a two-compartment reservoir for liquid, notably for supplying hydraulic fluid to master-cylinders, this reservoir being, more precisely, composed of two superposed complementary parts assembled by sticking, heat soldering or any other similar method, a median partition, solid with the said parts and oriented transversally to the longitudinal axis of the reservoir, dividing the interior of the latter into two compartments each provided with an outlet orifice, one at least of these compartments also having a filling orifice, and the two compartments communicating via a transfer channel which opens into each of them and which runs parallel to the plane of the level of liquid contained in the reservoir.

The afore-mentioned transfer channel allows hydraulic fluid to pass from one compartment of the reservoir to the other when filling with hydraulic fluid. However, it must be so designed that a sufficient quantity of fluid is retained in each of said compartments, which are respectively connected to the chambers of the dual master-cylinder, when the vehicle undergoes sharp acceleration or deceleration, or also when it is parked on steeply sloping ground.

In order to facilitate manufacture of such reservoirs for liquid and to make it more economical, the present invention proposes an improvement in the construction process mentioned hereinbefore, thanks to which it is possible to construct with the same constituent elements two types or reservoir usable at two different inclinations of the associated master-cylinder and especially at a zero inclination and at an inclination defined by an angle "$\alpha$" with respect to the horizontal.

This object is achieved, according to the present invention, due to the fact that the plane of junction of the two parts of the reservoir forms with the bottom of each of them an angle "$\alpha/2$" equal to half the angle of inclination defined above, that the lower part of the reservoir bears a lower transfer-channel part along each of its two side walls, the bottom of one of these channel parts originating at the level of the junction plane and at the lower end of one side wall and being inclined at an angle "$\alpha/2$" with respect to said junction plane, the bottom of the other channel part also originating at the level of the junction plane but at the higher end of the other side wall and being inclined in the opposite direction to the preceding at the same angle "$\alpha/2$" with respect to said junction plane, and that the upper part of the reservoir bears along one only of its two side walls an upper transfer-channel part, whose depth extends along said wall, said upper part of the transfer channel cooperating with one or other of the said lower parts, according to the relative position of the two constituent parts of the reservoir, so as to form a transfer channel of closed section open at its two ends, and along the other side wall a second channel part, of smaller depth, whose roof originates at the level of the junction plane and is inclined with respect to this plane at an angle greater than "$\alpha/2$", said transfer-channel part cooperating with the second lower part to form a channel of closed section at one end and capable at the other end of allowing air to escape on filling with fluid.

According to another embodiment of the present invention, the lower part of the reservoir bears a lower part of the transfer channel along each of its two side walls and the adjacent half of one of its transverse walls, the bottom of one of these parts of the channel originating at the level of the junction plane and at the lower end of one side wall and being inclined at an angle "$\alpha/2$" along the side wall and parallel along half of the transverse side wall with respect to the junction plane, the bottom of the other channel part also originating at the level of the junction plane, but at the higher end of the other side wall and being inclined in the opposite direction to the preceding at the same angle "$\alpha/2$" along the side wall and parallel along half of the transverse wall with respect to the junction plane and the upper part of the reservoir bears, along one of its side walls and along the two adjacent halves of the transverse walls an upper part of the transfer channel whose depth extends along all the parts of walls concerned.

This embodiment is particularly suitable in the case of the reservoir, in addition to resisting an excessive flow-black of fluid from one compartment to the other on sharp acceleration or deceleration, or when the vehicle is parked on ground sloping steeply longitudinally with respect to the vehicle itself, having also to resist a flow-back of fluid when the vehicle is parked on ground sloping steeply transversally with respect to the vehicle itself.

Thanks to this particular design of the constituent elements of the reservoir, it becomes actually possible, as will be explained in more detail in the ensuing description, to manufacture two types of reservoir corresponding to different angles of inclination of the associated master-cylinder, simply by reversing one of the constituent parts of the reservoir with respect to the other before assembly.

In a preferred embodiment of the invention, the lower transfer-channel parts are constituted by grooves of increasing depth provided in suitably thickened parts of the side walls of the lower part of the reservoir, these grooves communicating with the interior of the reservoir only in the vicinity of their deeper ends. The upper part of the transfer channel and the upper part of the escape channel are themselves constituted by two grooves of increasing height provided in the suitably thickened side walls of the upper part of the reservoir, said grooves also communicating with the interior of the reservoir only in the vicinity of their higher ends.

In another preferred embodiment of the invention, the lower parts of the transfer channel are constituted by grooves with a depth which partly increases and partly remains constant provided respectively in the suitably thickened side and transverse walls of the lower part of the reservoir, these grooves communicating with the interior of the reservoir only in the vicinity of their deeper ends.

The upper part of the transfer channel is constituted by a groove with a depth which partly increases and partly remains constant provided respectively in one side wall and in the two transverse walls, suitably thickened, of the upper part of the reservoir, this groove communicating at the two ends with the two compartments of the reservoir; finally, the upper part of the escape channel is constituted by a groove of increasing depth provided in the other suitably thickened side wall of the reservoir, this groove communicating with the interior of the reservoir only in the vicinity of its higher end.

The characteristics and advantages of the invention will appear more clearly from perusal of the following description of two preferred embodiments, given simply by way of illustrative example, and with reference to the accompanying drawings wherein:

FIG. 1 is a side view of a first type of two-compartment reservoir for liquid constructed according to the invention, and intended to be mounted on a horizontal master-cylinder.

FIG. 2 is a side view of a second type of reservoir constructed from the same elements as the preceding, but intended to be mounted on a master-cylinder whose axis forms an angle "α" with respect to the horizontal;

FIG. 3 represents in exploded perspective view the two constituent parts of the reservoir of FIG. 1 before assembly; and FIG. 4 represents in exploded perspective view the two constituent parts of the reservoir according to the second embodiment before assembly.

With reference firstly to FIG. 1 of the drawing, there is shown a two-compartment reservoir 10 for liquid intended to equip a dual master-cylinder with horizontal axis. This reservoir is composed of two superposed complementary parts 12 and 14, which are made for example of a thermoplastic material, and are assembled by sticking or heat soldering of their respective edges 13 and 15. The opposing faces of these last consequently define the plane of junction of the two constituent parts of the reservoir and FIG. 1 shows that this plane is inclined to the horizontal at an angle "α/2". Each of the parts 12 and 14 also includes a transverse median partition element 16 or 17 whose height is limited by the previously defined junction plane; these two partition elements are made solid with each other when the two parts of the reservoir are assembled, thus producing a continuous partition which divides the interior of the reservoir into two compartments 18 and 19 each provided with an outlet orifice for supplying one of the chambers of the master-cylinder. One of these compartments also has an orifice serving for filling the reservoir with hydraulic fluid. Communication between the two compartments 18 and 19 is ensured solely by means of a transfer channel with a horizontal bottom which runs along one of the side walls of the reservoir, and whose constitution will be described in more detail hereinafter. As mentioned in the introduction to the present specification, this transfer channel has the function of allowing hydraulic fluid to pass from one compartment of the reservoir to the other on sharp acceleration or deceleration, or again, when the vehicle is parked on steeply sloping ground.

If one of the constituent parts of the reservoir (which are superposed and of constant width) is now turned by 180° with respect to the other in a horizontal plane, and if these two parts are assembled in this new position relative to each other, a new type of reservoir 20 is obtained such as that represented in FIG. 2 of the drawings, the bottom and top of which reservoir, instead of being parallel to each other as in the instance of FIG. 1, define between them an angle "α" double the angle of inclination "α/2" of their junction plane. It will be easily understood from the drawing that this new type of reservoir for liquid is suitable for supplying a dual master-cylinder whose axis is itself inclined at an angle 37 α" to the horizontal, though this depends on the bottom of the transfer channel connecting the two compartments together being, here again, horizontal.

To ensure the horizontality of the bottom of the transfer channel in both instances, the invention provides for this transfer channel to be constituted by superposition of two complementary parts respectively moulded with the upper part and the lower part of the reservoir, these complementary parts of the transfer channel being made solid with each other when the reservoir is assembled, and being, more precisely, formed in the way described as follows:

As shown in FIG. 3 of the drawings, the lower part 14 of the reservoir includes, in the upper part of each of its side walls, which is suitably thickened for this purpose, a groove 22 or 24 able to act as a lower transfer-channel part. The bottom 23 of the groove 22 originates at the level of the junction plane and at the lower end of the side wall concerned, and it is inclined at an angle "α/2" with respect to this junction plane, which is equivalent to saying that it runs parallel to the bottom of the lower part 14 of the reservoir. Conversely, the bottom 25 of the other groove 24 originates at the level of the junction plane but at the higher end of the other side wall, and it is inclined in the opposite direction to the bottom 23 at the same angle "α/2" with respect to this junction plane, which is equivalent to saying that it is inclined at an angle 37 α" with respect to the bottom of the lower part 14 of the reservoir. The two grooves 22 and 24 which are thus provided in the thickness of the upper parts of the corresponding side walls are separated from the interior of the compartments 18 and 19 by thin walls 26 and 28, respectively, which stop at a short distance from their opposite ends at the points of origin of the corresponding grooves, so as to provide respectively a communicating passage 27 between the groove 22 and the compartment 19, and a communicating passage 29 between the groove 24 and the compartment 18. As a variant, the walls 26 and 28 could be extended over the whole length of the grooves in question and be pierced near their ends by one or several apertures creating a gap in their constituent material.

On the other hand, the upper part 12 of the reservoir includes, in the suitably thickened base of only one of its side walls, a groove 30 acting as upper transfer-channel part and a less deep groove 40 in the upper, suitably thickened, part of the other side wall. As shown in FIG. 3, the groove 30 extends along the whole wall and is separated from the interior of the reservoir by a partition wall 32 which stops at a short distance from its deeper end so as to provide a communicating passage 33 between the groove 30 and one of the compartments 18 or 19, whichever is the case. The other side wall of the upper part 12 of the tank is provided with another groove 40 whose roof 41 originates at the level of the junction plane and at the lower end of the side wall, this roof being inclined at an angle greater than "α/2" with respect to the junction plane described above.

This groove 40 is separated from the interior of the reservoir by a thin wall 42 which stops at a short distance from its deeper end so as to provide a communicating passage 43 between the groove 41 and one of the compartments 18 or 19, whichever is the case.

If the two parts of the reservoir are assembled in the relative position represented in FIG. 3, it will immediately be seen that the groove 30 of the upper part 12 and the groove 22 of the lower part 14 cooperate to form a transfer channel of closed section which opens at its end 33 into the compartment 18 and at its end 27 into the compartment 19.

The bottom 23 of such a transfer channel is parallel to the bottom of the lower part 14 of the reservoir, and consequently conforms to the mode of construction represented in FIG. 1 of the drawings.

The other groove 24 of the lower part 14 and the groove 40 of the upper part 12, cooperate, thus producing an escape channel of closed section which opens via two ends 29 and 43 into the compartment 18. The roof 41 of such an escape channel is so inclined to the horizontal that the upper part corresponds to the aperture 43, thus allowing air to escape from the channel on filing with fluid; the opposite end, in contrast, is blind over its whole depth and therefore cannot function to put the two compartments of the reservoir in communication.

If one of the constituent parts of the reservoir is now turned by 180° in a horizontal plane before assembly, it will immediately be seen that the groove 30 of the upper part 12 will come to cooperate with the groove 24 of the lower part 14, thus producing a transfer channel whose bottom 25 will be inclined at an angle "α" with respect to the bottom of the reservoir thus constituted, in conformance with the mode of construction illustrated in FIG. 2 of the drawings, this transfer channel communicating at its end 33 with the compartment 19 and at its end 29 with the compartment 18 of the reservoir.

In this instance as in the preceding, the bottom of the transfer channel thus runs in a horizontal plane, i.e. parallel to the level of the liquid contained in the reservoir.

Conversely, the groove 22 of the lower part 14 and the groove 40 of the upper part 12 will cooperate to form the escape channel of closed section which will open via both ends 27 and 43 into the compartment 19. The roof of such an escape channel is so inclined to the horizontal that the upper part corresponds to the aperture 43, thus allowing air to escape on filling with fluid; the opposite end, in contrast, is blind over its whole depth and therefore cannot function to put the two compartments of the reservoir in communication.

As shown in FIG. 4, representing another embodiment of the invention, the lower part 114 of the reservoir includes, in the suitably thickened upper part of its walls, a groove 122 or 124 which can act as the lower part of the transfer channel.

The bottom 123 of the groove 122 originates at the level of the junction plane at the lower end of the side wall and it is first inclined with respect to this junction plane at an angle "α/2" along the side wall and then parallel along the adjacent half of the transverse wall of greater height, i.e. it runs parallel to the bottom of the lower part 114 of the reservoir.

Conversely, the bottom 125 of the other groove 124 originates at the level of the junction plane but at the higher end of the other side wall and relative to this junction plane, it is first inclined in the opposite direction to the bottom 123 at the same angle "α/2" along the side wall and then parallel along the adjacent half of the lower transverse wall, i.e. it is inclined at an angle "α" with respect to the bottom of the lower part 114 of the reservoir.

The two grooves 122 and 124 thus provided in the thickness of the upper parts of the corresponding walls are separated from the interior of the compartments 118 and 119 by the walls 126 and 128, which stop at a short distance from the central axis of the lower and higher transverse walls respectively so as to provide respectively a communicating passage 127 between the groove 122 and the compartment 119, and a communicating passage 129 between the groove 124 and the compartment 118. As a variant, the walls 126 and 128 could be extended over the whole length of the grooves in question and be pierced near their end by one or several apertures creating a gap in their constituent material.

On the other hand, the upper part 112 of the reservoir includes in the suitably thickened upper part of one of its side walls and the two transverse walls a groove 130 acting as the upper part of the transfer channel and in the suitably thickened upper part of the other side wall a less deep groove 140 acting as the upper part of the escape channel.

As shown in FIG. 4, the groove 130 extends in depth along all the wall-parts concerned and is separated from the interior of the reservoir by a partition wall 132 which stops at a short distance from the central axis of the two transverse walls so as to provide a communicating passage between the two compartments 118 and 119 via the two apertures 133 and 135.

The other side wall of the upper part 112 of the reservoir is provided with another groove 140 whose roof 141 originates at the level of the junction plane and at the lower end of the side wall, this roof being inclined at an angle greater than "α/2" with respect to the aforementioned junction plane.

This groove 140 is separated from the interior of the reservoir by a partition wall 142 which stops at a short distance from its deeper end, so as to make a communicating passage 143 between the groove 141 and one of the compartments 118 and 119, whichever is the case.

If the two parts of the reservoir are assembled in the relative position represented in FIG. 4, it will immediately be seen that the groove 130 of the upper part 112 and the groove 122 of the lower part 114, cooperate to form a transfer channel of closed section, which opens at its end 133 into the compartment 118 and at its ends 127 and 135 into the compartment 119.

The bottom 123 of such a transfer channel is parallel to the bottom of the lower part 114 of the reservoir, and consequently conforms to the mode of construction represented in FIG. 1 of the drawings.

The other groove 124 of the lower part 114 and the groove 140 of the upper part 112 cooperate to form an escape channel of closed section which opens at its two ends 129 and 143 into the compartment 118. The roof 141 of such an escape channel is so inclined to the horizontal that the higher part corresponds to the passage 143 thus allowing air to escape from the channel on filling with fluid; the opposite end, in contrast, is blind over its whole depth and therefore cannot function to put the two compartments of the reservoir in communication.

If one of the constituent parts of the reservoir is now turned by 180° in a horizontal plane before assembly, it will immediately be seen that the groove 130 of the upper part 112 will come to cooperate with the groove 124 of the lower part 114, thus producing a transfer channel whose bottom 125 will be inclined at an angle "α" with respect to the bottom of the reservoir thus constituted, in conformance with the mode of construction illustrated in FIG. 2 of the drawings, this transfer channel communicating at its end 133 with the compartment 119 and at its ends 129 and 135 with the compartment 118 of the reservoir.

In this instance, as in the preceding, the bottom of the transfer channel thus runs in a horizontal plane, i.e. parallel to the level of the liquid contained in the reservoir.

Conversely, the groove 122 of the lower part 114 and the groove 140 of the upper part 112 will come to cooperate to form the escape channel of closed section which will open at both ends 127 and 143 into the compartment 119. The roof 141 of such an escape channel will be so inclined to the horizontal that the higher part corresponds to the passage 43, thus allowing air to escape from the channel on filling with fluid; the opposite end, conversely, will consequently be blind over its whole depth and therefore will not function to put the two compartments of the reservoir in communication.

I claim:

1. Two-compartment reservoir for liquid, particularly for supplying dual master-cylinders with hydraulic fluid, composed of two complementary parts superposed and assembled by sticking, heat soldering, or other similar method, a median partition solid with said parts and oriented transversally to the longitudinal axis of the reservoir dividing the interior of the latter into two compartments each provided with an outlet orifice, one at least of these compartments having in addition a filling orifice, and the two compartments communicating via a transfer channel which opens into each of them characterized in that said transfer channel runs along one of the side walls of the reservoir and parallel to the plane of the level of liquid contained in this reservoir, this transfer channel itself being composed of two superposed complementary parts, namely a lower part in the general shape of a gutter and an upper part, solid respectively with the lower part and upper part of the reservoir, these parts together defining a closed contour and their junction plane coinciding with that of the constituent parts of the reservoir, and in which, to allow construction with the same constituent elements of two types of reservoir usable for two different inclinations of the associated master-cylinder, and particularly at a zero inclination and at an inclination defined by an angle ($\alpha$) with respect to the horizontal, the plane of junction of the two parts (12, 14) of the reservoir forms with the bottom of each of them an angle ($\alpha/2$) equal to half the angle of inclination defined above, that the lower part (14) of the reservoir bears a lower transfer-channel part along each of its two side walls, the bottom (23) of one of these channel parts (22) originating at the level of the junction plane and at the lower end of a side wall and being inclined at an angle ($\alpha/2$) with respect to said junction plane, the bottom (25) of the other channel part (24) also originating at the level of the junction plane but at the higher end of the other side wall and being inclined in the opposite direction to the preceding at the same angle ($\alpha/2$) with respect to said junction plane, and that the upper part (12) of the reservoir bears along one of its two side walls an upper transfer-channel part whose depth extends along the whole wall, said upper part of the transfer channel cooperating with one or other of said lower parts according to the relative position of the two constituent parts of the reservoir so as to form a transfer channel of closed section opening at its ends, and along the other side wall a second channel part, less deep, whose roof originates at the level of the junction plane and is inclined with respect to this last at an angle greater than $\alpha/2$ the said channel part cooperating with the second lower part to form a channel blind at one end and capable, at the other end, of allowing air to escape on filling with fluid.

2. Reservoir according to claim 1, characterized in that the lower transfer-channel parts are constituted by grooves (22, 24) of increasing depth provided in the suitably thickened side walls of the lower part (14) of the reservoir, these grooves communicating with the interior of the reservoir only in the vicinity of their deeper ends.

3. Reservoir according to any one of claims 1 to 2, characterized in that the upper part of the transfer channel and the upper part of the escape channel are themselves constituted by grooves (30, 40) of increasing height provided in the suitably thickened side walls of the upper part (12) of the reservoir, these grooves communicating with the interior of the reservoir only in the vicinity of their higher ends.

4. Reservoir according to claim 1, characterized in that the lower part (114) of the reservoir bears a lower part of the transfer channel along each of its two side walls and half of one of its transverse walls, the bottom (123) of one of these channel parts (122) originating at the level of the junction plane and at the lower end of one side wall and being inclined at an angle ($\alpha/2$) along the side wall and parallel along half of the transverse wall with respect to the junction plane, the bottom (125) of the other channel part (124) also originating at the level of the junction plane, but at the higher end of the other side wall and being inclined in the opposite direction to the preceding at the same angle ($\alpha/2$) along the side wall and parallel along half of the transverse wall with respect to the junction plane, and the upper part (112) of the reservoir bears along one of its side walls and along the two adjacent halves of its transverse walls an upper part of the transfer channel whose depth extends along all the wall-parts concerned.

5. Reservoir according to claim 4, characterized in that the lower parts of the transfer channel are constituted by grooves (112, 124) with a depth which partly increases and partly remains constant provided respectively in the suitably thickened side and transverse walls of the lower part (114) of the reservoir, these grooves communicating only near their deeper ends.

6. Reservoir according to any one of claims 4 to 5, characterized in that the upper part of the transfer channel is constituted by a groove (130) with a depth which partly increases and partly remains constant provided respectively in one side wall and in the two transverse walls, suitably thickened, of the upper part (112) of the reservoir, this groove communicating at both ends with the two compartments of the reservoir.

7. Reservoir according to any one of claims 4 or 5, characterized in that the upper part of the escape channel is constituted by a groove (140) of increasing depth provided in the other suitably thickened side wall of the reservoir, this groove communicating with the interior of the reservoir only in the vicinity of its higher end.

8. Reservoir according to any one of claims 1, 2, 4 or 5, characterized in that the walls (26, 28; 126, 128) which separate the grooves (22, 24; 122, 124) from the interior of the reservoir are provided with gaps (27,29; 127,129) near said ends.

9. Reservoir according to any one of claims 1, 2, 4 or 5, characterized in that the walls (32, 42; 132, 142) which separate said grooves (30, 40; 130, 140) from the interior of the reservoir are provided with gaps (33,43) 133, 143) near said ends.

* * * * *